3,704,298
4-ACYLOXY-3-(2-ISOXAZOLOCARBAMYL)-2H-1,2-BENZOTHIAZINE 1,1-DIOXIDES

Harold Zinnes, Rockaway, Martin L. Schwartz, Gillette, and John Shavel, Jr., Mendham, N.J., assignors to Warner-Lambert Company, Morris Plains, N.J.
No Drawing. Filed June 22, 1971, Ser. No. 155,605
Int. Cl. C07d 93/02
U.S. Cl. 260—243 R                                       1 Claim

ABSTRACT OF THE DISCLOSURE

Compounds of the formula

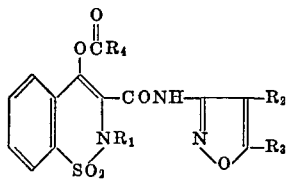

are disclosed, wherein $R_1$ is alkyl; $R_2$ and $R_3$ are hydrogen or alkyl and $R_4$ is alkyl, aryl, aralkyl, heterocyclic or alicyclic. They are prepared in accordance with the following reaction scheme:

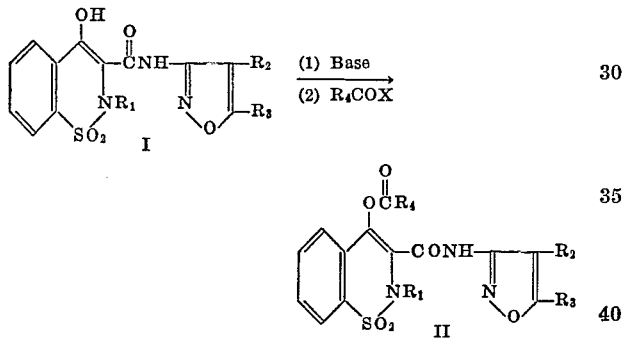

These compounds are useful as anti-inflammatory agents, antipyretics and analgesics.

---

The present invention relates to 4-acyloxy-3-(3-isoxazolocarbamyl)-2H-1,2-benzothiazine 1,1-dioxides having the following structural formula:

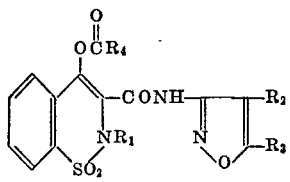

whetrein $R_1$ is alkayl; $R_2$ and $R_3$ are hydrogen or alkyl and $R_4$ is alkyl, aryl, aralkyl, heterocyclic or alicyclic.

In the above definitions for $R_1$, $R_2$, $R_3$ and $R_4$ the term "alkyl" embraces both straight and branched chain alkyl radicals containing 1 to 8 carbon atoms, e.g., methyl, ethyl, propyl, isopropyl, n-butyl, n-amyl, n-hexyl, 2-ethyl-butyl, 2,3-dimethylbutyl, and the like. The term "aryl" denotes a monocyclic aromatic hydrocarbon radical, preferably of 6 to 10 carbon atoms such as phenyl, tolyl, and the like. The term "aralkyl" encompasses alkyl groups in which aryl, as defined above, is substituted for a hydrogen atom, e.g., benzyl, phenethyl, and the like, and also includes such groups in which one or more of the hydrogen atoms of the aryl portion have been substituted. The term "heterocyclic" includes a 5- or 6-membered ring containing O, S or N in the ring.

The compounds of this invention are useful as anti-inflammatory agents, antipyretics and analgesics. When administered orally or parenterally to mammals, such as rats, in doses of 10 to 250 mg./kg. they reduce the swelling of the rat paw induced by injection into the foot pads of these rats by an irritant such as carrageenin. At an oral dose of 10 to 250 mg./kg., the compounds of this invention have also been observed to inhibit yeast-induced hyperthermia in the rat. Oral doses of 25 to 100 mg./kg. also produce an analgesic effect as determined by the phenylquinone writhing syndrome test in experimental animals such as mice. These methods for the determination of anti-inflammatory activity and antipyretic activity are well known in the art.

Accordingly, the compounds of this invention are indicated in conditions such as arthritis in a mammal such as cats, dogs, monkeys and the like. A dosage regimen of 10 to 250 mg./kg. orally or by injection several times a day is recommended. This dosage regimen can be varied in accordance with age, weight and severity of the condition being treated.

In order to use these compounds, they are formulated into dosage forms commonly used in oral or parenteral administration. These include, e.g., tablets, capsules, suspensions, solutions for injection and the like. These formulations are prepared by mixing the active ingredient with pharmaceutical excipients such as lactose, dicalcium phosphate and sterile water and compounded by methods well known to the pharmacist's art to give final forms containing 10 to 250 mg. per dosage unit.

According to the present invention, these novel benzothiazines are prepared by the following reaction scheme:

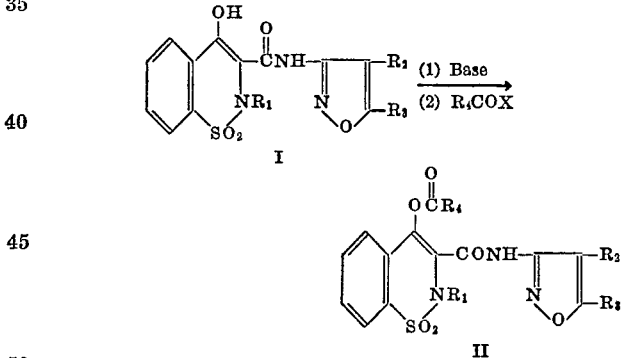

Briefly, the preparation comprises converting Compound I to its anion by the use of a base such as sodium hydride and treating the anion with an acyl halide of structure $R_4COX$.

The starting Compound I is prepared in accordance with the description set forth in our copending application Ser. No. 119,967 filed Mar. 1, 1971.

The following example is included in order further to illustrate the invention.

EXAMPLE

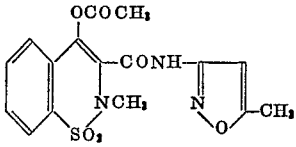

4-hydroxy - 2 - methyl-N-(5-methyl-3-isoxazolyl)-2H-1,2-benzothiazine-3-carboxamide acetate 1,1-dioxide A slurry of 10.05 g. (0.03 mol) of 4-hydroxy-2-methyl-N - (5 - methyl-3-isoxazolyl)-2H-1,2-benzothiazine-3-carboxamide 1,1-dioxide in 100 ml. of tetrahydrofuran was cooled to 0° C. and 1.29 g. (0.03 mol of NaH) of a 57% mineral oil dispersion of sodium hydride was added in small portions. The mixture was allowed to warm slowly to 25° C. and stirred at this temperature until hydrogen evolution had ceased. It was then cooled to 0° C., a solution 2.37 g. (0.03 mol) of acetyl chloride in 50 ml. of tetrahydrofuran was added, and it was stirred at 25° C. for 17 hours. The solvent was removed and the residue stirred with 600 ml. of water. Filtration gave 13 g. of crude product, M.P. 180°–182° C. dec. Recrystallization from ethyl acetate gave 7.2 g. of crystalline material, M.P. 193°–194° C. dec.

*Analysis.*—Calcd. for $C_{16}H_{15}N_3O_6S$ (percent): C, 50.93; H, 4.01; N, 11.13; S, 8.50. Found (percent): C, 50.79; H, 4.06; N, 11.07; S, 8.66.

We claim:
1. 4-hydroxy - 2 - methyl - N - (5-methyl-3-isoxazolyl)-2H-1,2-benzothiazine-3-carboxamide acetate 1,1-dioxide.

References Cited

UNITED STATES PATENTS 3,646,020  2/1972  Zinnes et al. -------- 260—243

JOHN M. FORD, Primary Examiner

U.S. Cl. X.R.

424—246